(12) United States Patent
Koivula et al.

(10) Patent No.: US 6,187,191 B1
(45) Date of Patent: Feb. 13, 2001

(54) FILTER HAVING AN END FLANGE WITH A DOWNWARDLY-BENT EDGE PORTION

(75) Inventors: Tuomo Koivula, Tampere; Marko Kangasniemi, Vesilahti, both of (FI)

(73) Assignee: Parker Hannifin OY, Vantaa (FI)

( * ) Notice: Under 35 U.S.C. 154(b), the term of this patent shall be extended for 0 days.

(21) Appl. No.: 09/067,273

(22) Filed: Apr. 27, 1998

Related U.S. Application Data

(63) Continuation of application No. PCT/FI96/00566, filed on Oct. 25, 1996.

(30) Foreign Application Priority Data

Oct. 27, 1995 (FI) .......................................... 955127

(51) Int. Cl.⁷ .................................................. B01D 27/00
(52) U.S. Cl. .................. 210/440; 210/450; 210/DIG. 17; 210/443
(58) Field of Search ..................... 210/440, 443, 210/450, 453, 454, DIG. 17, 442; 277/918

(56) References Cited

U.S. PATENT DOCUMENTS

| | | | |
|---|---|---|---|
| 2,055,180 | * | 9/1936 | Nelson . |
| 2,995,253 | * | 8/1961 | Belgarde et al. ..................... 210/323 |
| 3,256,989 | * | 6/1966 | Hultgren . |
| 4,721,563 | * | 1/1988 | Rosaen ................................. 210/85 |
| 5,171,430 | | 12/1992 | Beach et al. . |
| 5,342,519 | | 8/1994 | Friedman et al. . |
| 5,681,461 | | 10/1997 | Gullett et al. . |
| 5,779,903 | * | 7/1998 | Smith et al. ........................... 210/440 |

FOREIGN PATENT DOCUMENTS

| | | |
|---|---|---|
| 1933 283 | 1/1971 | (DE) . |
| 41 27 031 A1 | 2/1993 | (DE) . |
| WO 95/00232 | 6/1994 | (WO) . |

\* cited by examiner

Primary Examiner—Matthew O. Savage
Assistant Examiner—Marianne Ocampo
(74) Attorney, Agent, or Firm—Christopher H. Hunter

(57) ABSTRACT

The invention relates to a spin-on filter (1) for filtering a flowing substance, especially a hydraulic liquid or lubricating oil in combustion motors. The filter (1) comprises a casing (7), open at one end, which is connected to a device assembly (6) including inlet and outlet ducts (4, 5) for the flow to be filtered, and a substantially cylindrical replaceable filter element (12) fitted inside the casing. The flow to be filtered passes through the filter element mantle, either radially-inwardly or radially outwardly. The cylindrical filter element (12) includes an end flange (16), designed such that its outer edge (17) simultaneously acts as a seal for the casing (7) end. The flange (16) can be made by injection-molding plastic in one piece and is equipped with flow openings (18) required for the flow to be filtered and communicating with the inlet or outlet ducts in the device assembly. The filter may include a joint ring (13), the end flange of the filter element forming a seal (17) between the casing and the joint ring. The filter also includes a collar (10) with a thread (2), by which the assembled filter can be connected as a unit to the device assembly (6) by screwing.

21 Claims, 2 Drawing Sheets

FILTER HAVING AN END FLANGE WITH A DOWNWARDLY-BENT EDGE PORTION

CROSS REFERENCE TO RELATED APPLICATION

This application is a continuation of copending International Application No. PCT/FI96/00566 filed on Oct. 25,1996 and which designated the United States.

FIELD OF THE INVENTION

This invention relates to a filter for filtering a flowing substance, such as lubricating oil and hydraulic liquid.

BACKGROUND OF THE INVENTION

One of the applications of encased cylindrical filters is filtering lubricating oil in combustion motors so as to keep the oil free of impurities. A second typical field of application for filters of this type is filtering hydraulic liquid in hydraulic systems. Since the filter is fouled in operation and has to be replaced at intervals, the filter casing must be removable from the device assembly, to which it is attached.

There are previously known oil filters, in which the filter means and the surrounding casing have been constructed as a solid unit, and are replaceable. However, such a design is a waste of material and also produces landfill waste.

From an ecological viewpoint, it is preferable to devise a casing that can be opened, so that the clogged filtering means alone is replaced and the casing is put back in position with the device assembly. U.S. Pat. No. 5,342,519 is cited as an example of such a design, in which the assembled oil filter comprises a cylindrical, replaceable filter means, a perforated support pipe within the filter means, a collar as an extension of the support pipe, a casing surrounding the filter means and a joint ring at the casing opening. This filter design includes two threaded joints with O-ring seals, one of which connects the casing to the joint ring and the other which connects the assembled filter with the collar to the device assembly so as to provide a seal between the joint ring and the device assembly. There are also conventional operable filter designs in which one single threaded joint is sufficient to connect a unit consisting of a filter means, a casing and any joint members to the device assembly.

In replaceable filters, the casing must be tightly sealed to the device assembly, since otherwise the medium to be filtered, such as pressurized lubricating oil or hydraulic liquid, will extrude through the joints between the elements into the environment. Such a visible leak will immediately reveal the deficiency or absence of a seal. In contrast, current filter designs do not show outwardly whether the filter means is fitted in position or not. With such filters, it is quite possible to remove a clogged filter means and subsequently put the casing back in position, without replacing the removed filter means. Obviously, as a result of such a mistake filtering will no longer take place.

SUMMARY OF THE PRESENT INVENTION

The purpose of the present invention is to reach a solution in which the risk of misuse mentioned above is eliminated, while providing a more straightforward filter design. The filter in accordance with the invention is characterized by the fact that the cylindrical filter means includes an end flange, whose circumferential outer edge acts as a seal for the casing end and where this edge includes one or more flow openings, through which the outside of the filter means mantle communicates with the inlet or outlet duct for flow to be filtered in the device assembly.

If a filter means is not present in the fitted casing, the casing will be unsealed, and a leak will immediately occur in operation at the casing joint. It will be impossible in practical operation to run a motor, a hydraulic system or the like over a long period of time without filtering. The filter in accordance with the invention has the further advantage of reducing the number of separate components in the design and of providing a less complex assembly, owing to the combined seal for the filter means and the casing end.

The filter casing is usually sealed to the device assembly at one end, the one end including both an inlet duct for the flow to be filtered and an outlet duct for the filtered flow. The casing is closed at its opposite end. The outer edge of the end flange of the filter means forms an O-seal ring, and the outside of the filter means mantle communicates through the flow opening or openings in this ring with the flow duct in the device assembly. Typically this flow duct is an inlet duct for the flow to be filtered, the flow being directed from the outside of the cylindrical filter means to its inside, from where the filtered flow continues into an outlet duct in the device assembly; however, an inverse flow direction would be quite as possible.

A preferred embodiment of the present invention is characterized in that the annular seal formed by the end flange of the filter means bears against the outer surface of the casing opening such that the pressure prevailing within the casing will increase the strain on the seal. The seal position in accordance with the present invention, which in fact is independent of the seal design, will provide tighter sealing during the filtering process, unlike many conventional sealing arrangements, including the solution described in U.S. Pat. No. 5,342,519, in which the seal ring is placed inside the casing end.

Besides a casing and a replaceable filter means, the filter design in accordance with the present invention preferably comprises a perforated support member with an associated collar within the filter means, and a joint ring between the casing and the device assembly. In this case, the end flange of the filter means acts as a seal between the casing and the joint ring, and the assembled filter can be connected to the device assembly as a unit by screwing the collar thread into the device assembly.

The filter provided with a replaceable filter means in accordance with the invention is particularly suitable as a hydraulic or lubricating oil filter, but is also usable as any liquid filter, such as a water or fuel filter.

DETAILED DESCRIPTION OF THE PREFERRED EMBODIMENT

Figure 1:
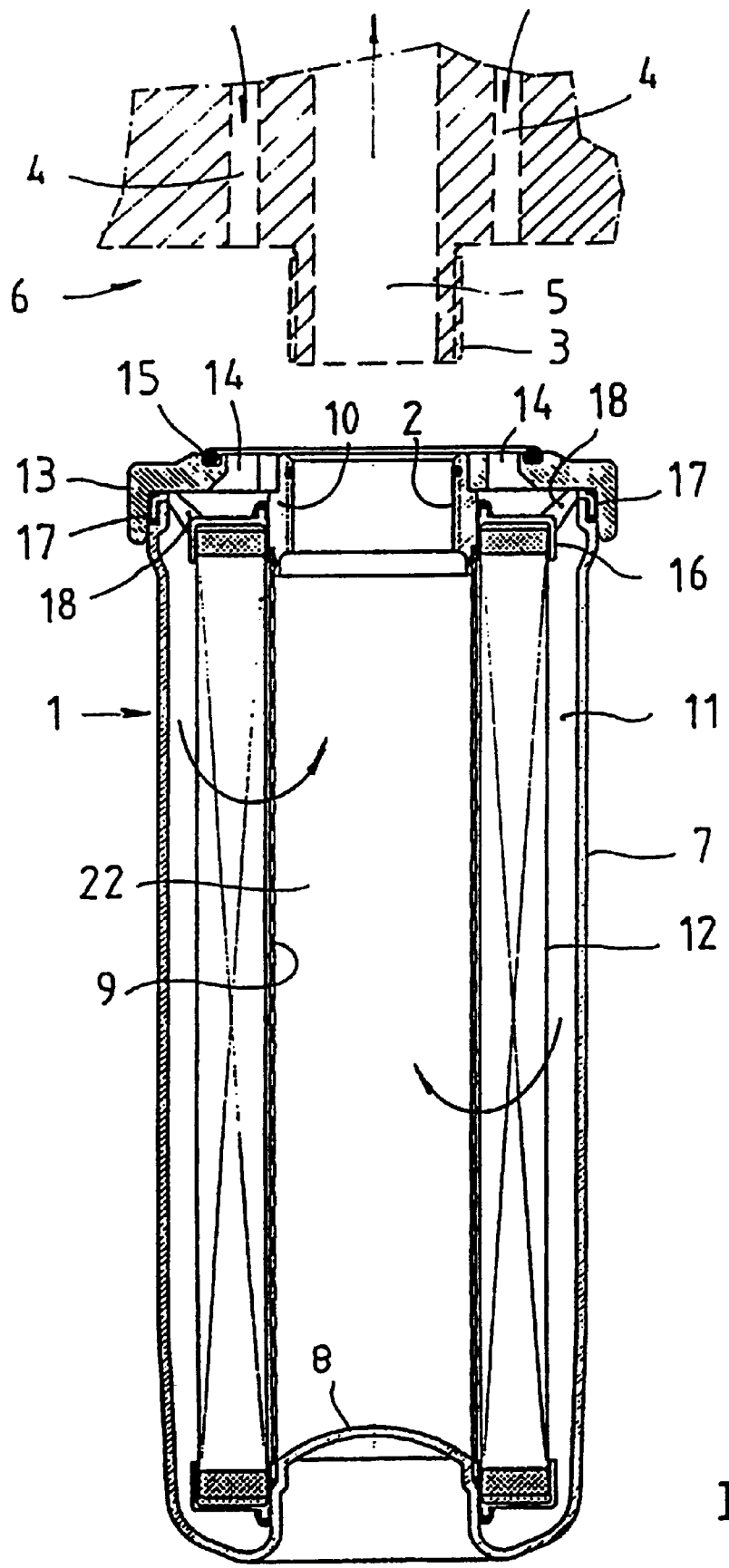
FIG. 1 shows as assembled filter in accordance with the invention, and a device assembly to which the filter can be attached by screwing.

FIG. 1 shows a filter, indicated generally at 1, constructed in accordance with the invention. The filter, typically referred to as a "spin-on" filter, is particularly suited as a replaceable oil filter in a combustion motor. The filter is composed of elements, which, assembled as in FIG. 1, can be connected by a threaded joint 2, 3 to a device assembly, indicated generally at 6, comprising inlet and outlet ducts 4, 5 for the flow to be filtered.

Filter 1 comprises a closed casing 7 preferably made of metal or plastic, which is open at the end facing device assembly 6. A perforated support pipe 9 is attached as an extension of a deep-drawn recess 8 at the opposite end of the casing and ends at the end facing the device assembly 6 in a collar 10 provided with an internal thread 2. A cylindrical filter means 12 is fitted in the cavity 11 between the casing mantle (wall) and the support pipe and has a filtering layer preferably consisting of, e.g., fluted paper or non-woven fiber pulp. A joint ring 13 bears against the open casing end and has flow openings 14 for the incoming flow of substance to be filtered.

The fluid is directed from flow inlet ducts 4 in the device assembly into filtering cavity 11 within the casing. Joint ring 13 is equipped with an O-ring seal 15, which seals the joint between the joint ring and device assembly 6 when filter 1 is screwed into position. The sealing between the open end of casing 7 and joint ring 13 is provided in accordance with the present invention by equipping the cylindrical filter means 12 with an end flange 16. End flange 16 is appropriately manufactured by injection molding plastic, and has an outer edge 17 formed as an O-ring seal between the outer surface of the casing end and the joint ring, and has inside its edge flow inlets 18 for the incoming flow of substance to be filtered, which is directed from the inlet ducts 4 in device assembly 6 into filter cavity 11 inside the casing.

Figure 2:
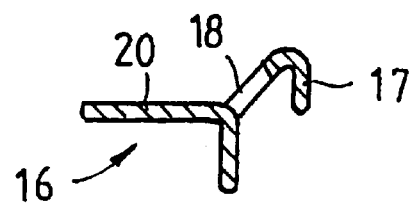
FIG. 2 shows the end flange of the filter means pertaining to the filter as cross-section II—II of FIG. 3.
Figure 3:
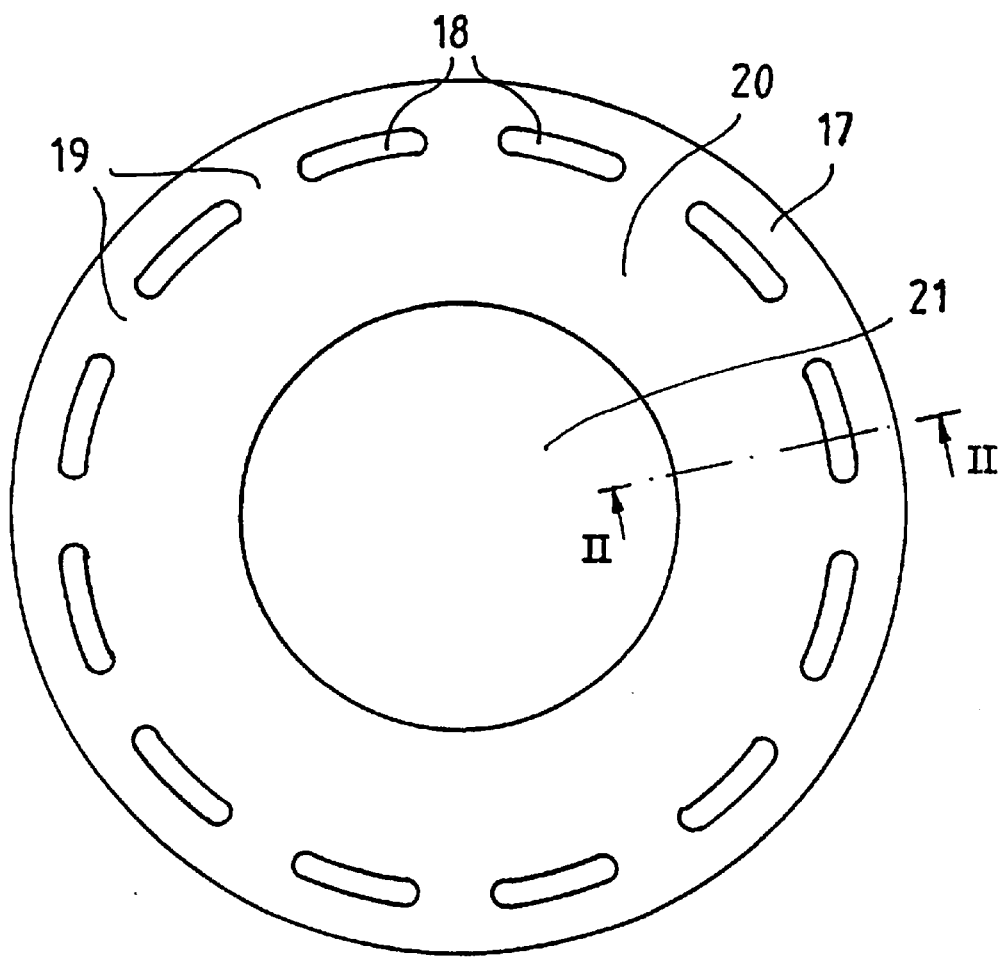
FIG. 3 is a top plan view of the end flange of the filter means.

The circular shape of the end flange 16 of the filter means is shown in detail in FIGS. 2 and 3. The flange comprises a downwardly-bent edge portion 17, which acts as an O-ring seal between the outer surface of the casing opening and the joint ring, and flow openings 18, disposed at regular intervals to form a ring inside the edge portion. The bridges 19 between the flow openings 18 connect edge portion 17 of flange 16 to the inner portion 20 support the end of the filter means. An opening 21 is provided in the center of flange 16 to enable the flange to be fitted around the fitted collar 10, as shown in FIG. 1.

Figure 4:
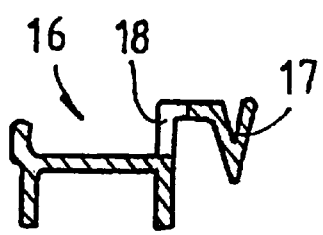
FIG. 4 shows the end flange of a filter means of a second embodiment of the invention, as a cross-section corresponding to FIG. 2.

FIG. 4 shows an optional embodiment of end flange 16 of the filter means, one of the differences from the embodiment in FIGS. 2 and 3 being that its outer edge 17 acting as a seal has been given a V shape, enabling it to yield by flattening or opening up, depending of the pressure exerted on it. It should be noted in this context that a flexible end flange 16 acting as a seal can be given various designs within the scope of professional know-how. In this case, it is also possible to form at least the components 20 of the flange that bear against the end of the filter means of a more rigid material, alongside which a softer material, particularly suitable as a seal, is used at the outer edge 17 of the flange.

A filter 1 assembled as in FIG. 1 is attached to device assembly 6 by screwing the internal thread 2 in collar 10 into the matching external thread 3 in the device assembly 6. With filter 1 in operation, the flow to be filtered is directed from inlet ducts 4 through the joint ring and flow inlets 14, 18 in the end flange of the filter means into a filter cavity 11 delimited by casing 7, from where the flow is filtered through the filter material layer in filter means 12 and directed through the perforated pipe 9 into the cavity 22 within the pipe, from where the filtered flow is removed into outlet duct 5 in the device assembly. The flow direction is indicated with arrows in FIG. 1. The flow direction could be inverse in principle, however, in this case the filter design should be modified such that support pipe 9 would bear against the outer surface of the cylindrical filter means 12.

A clogged filter means 12 is replaced by screwing off filter 1 from device assembly 6, by withdrawing casing 7, support pipe 9 and collar 10, formed together as a solid piece, from joint ring 13, and by removing filter means 12 from the cavity 11 between the casing and the support pipe. After this, a new filter means 12 is fitted into cavity 11 with the outer edge 17 of its end flange 16 fitted as a seal around the opening of casing 7, and subsequently joint ring 13 is pressed into position. The filter thus assembled is fixed to device assembly 6 by screwing it to the assembly as a unit.

It is obvious to those skilled in the art that the various embodiments of the invention are not restricted to the examples given above, but may vary within the scope of the accompanying claims. Thus, the threaded joint between filter 1 and device body 6 may differ from FIG. 1 in that the filter collar 10 is provided with an external thread and the device body with a matching internal thread.

What is claimed is:

1. A filter assembly for filtering a fluid, said filter assembly including: i) a device assembly including an inlet flow duct and an outlet flow duct; ii) a casing open at an upper one end; said casing being tightly connected to the device assembly, and iii) a substantially cylindrical replaceable filter element fitted inside the casing, the flow from the inlet flow duct passing through the filter element, said filter element including an end flange disposed against an end of the filter element, said end flange having a circumferential, outer edge formed of plastic material and has a downwardly-bent edge portion disposed against an outer surface of the casing to provide a seal for the casing end, the outer edge of the end flange disposed against the upper end opening of the casing such that fluid pressure within the casing increases the strain on the seal, and at least one flow opening spaced radially inward from the circumferential outer edge which provides fluid communication between the inlet flow duct and an outer surface of the filter element.

2. The filter assembly as in claim 1, wherein the outer edge of the end flange surrounds an outer surface of the casing such that fluid pressure within the casing forces the casing outward against the flange.

3. The filter assembly as in claim 2, further including a ring-shaped wall radially outwardly spaced from the end opening of the casing, the outer edge of the end flange is disposed between and against the end opening of the casing and the ring-shaped wall.

4. The filter assembly as in claim 3, further including a joint ring between the casing and the device assembly, and the ring-shaped wall is defined on a radially inner surface of the joint ring.

5. The filter assembly as in claim 2, wherein the casing has a cylindrical configuration and the outer surface of the casing faces radially-outward, and the outer edge of the end flange is disposed against and circumferentially surrounds the radially-outward facing surface of the casing such that fluid pressure within the casing forces the casing radially-outward against the end flange.

6. The filter assembly as in claim 1, wherein an axial support member is attached inside the casing and the replaceable filter element is located in a cylindrical cavity defined between the casing and the support member, and a collar is provided in the casing supporting the support member, said collar including threads such that the casing, the support member and the collar can be connected as a unit to the device assembly by screwing.

7. The filter assembly as in claim 6, wherein the support member consists of a perforated support pipe.

8. The filter assembly as in claim 6, further including a joint ring between the casing and the device assembly, and the seal provided by the end flange of the filter element being located between the casing end and the joint ring.

9. The filter assembly as in claim 1, wherein bridges are defined between the flow openings in the end flange, and the bridges are regularly spaced to form a ring of flow openings, in which the bridges connect the outer edge portion of flange with an inner portion of the flange disposed against the end of the filter element.

10. The filter assembly as in claim 1, wherein the flow openings in the end flange communicate with the inlet flow duct for flow to be filtered and an inner surface of the filter element is in fluid communication with the outlet flow duct for filtered flow in the device assembly.

11. The filter assembly as in claim 1, wherein the end flange of the filter element forming the seal is formed in one piece from injection-molded plastic.

12. The filter assembly as in claim 1, further including a joint ring between the casing and the device assembly, and the seal provided by the end flange of the filter element being located between the casing end and the joint ring.

13. A filter element for filtering a fluid, said filter element including:

a cylindrical filter layer circumscribing a central cavity, a circular end flange disposed against an upper end of the filter layer, said end flange having i) an inner portion supporting the end of the filter layer, ii) a circumferential, outer edge formed of plastic material spaced radially-outward from the inner portion, the outer edge having a downwardly-bent edge portion providing an uninterrupted, circumferential, seal, and iii) at least one flow opening in the end flange spaced radially inward from the circumferential outer edge and radially outward from the inner portion which provides fluid communication through the end flange.

14. The filter element as in claim 13, wherein the downwardly-bent edge portion circumscribing the end flange.

15. The filter element as in claim 14, wherein the downwardly bent edge portion of the outer edge has a V-shaped cross-section.

16. The filter element as in claim 15, wherein the V-shaped cross-section of the outer edge opens upwardly from the end flange.

17. The filter element as in claim 13, wherein a plurality of flow openings are provided around the end flange.

18. The filter element as in claim 17, wherein bridges are defined between the flow openings in the end flange, and the bridges are regularly spaced to form a ring of flow openings, in which the bridges connect the outer edge portion of flange with an inner portion of the flange disposed against the end of the filter element.

19. The filter element as in claim 13, wherein the flange includes a central circular opening providing fluid communication with the central cavity of the filter element.

20. The filter element as in claim 13, wherein the end flange of the filter element forming the seal is formed in one piece from injection-molded plastic.

21. The filter element as in claim 13, wherein the circumferential outer edge is continuously circular.

* * * * *